United States Patent Office

3,359,717
Patented Dec. 26, 1967

3,359,717
FIBROUS BLENDS AND METHOD OF MANUFACTURE
Alfred Marzocchi, Cumberland, and James J. Dillon, Providence, R.I., assignors to Owens-Corning Fiberglas Corporation, a corporation of Delaware
No Drawing. Filed Jan. 7, 1965, Ser. No. 424,134
14 Claims. (Cl. 57—140)

ABSTRACT OF THE DISCLOSURE

Intimate blends of high temperature-resistant inorganic fibers, of a length too short to card, and with very fine, heat-softenable fibers, such as glass fibers, having diameters in the range from about .00008 inch to about .00018 inch, the fibers being at least ½ inch in length. In one important aspect, a drag or friction agent, such as colloidal silica, is applied on the surfaces of the glass fibers during the intimate blending to overcome the inherent slipperiness of the fibers and hold all fibers in intimate blended condition. The blends are so thorough and intimate that they provide a substantial advance over the art, where asbestos has been "admixed" or "intermingled" into a glass strand, and where the fibers have much larger diameters than those of the invention.

A process of forming the fibrous blends wherein continuous strands of such fine glass fibers are chopped into bundles of at least ½ inch length and then subjected to a turbulent admixing with the normally non-cardable inorganic fibers, such as short length asbestos fibers, to open the ends of the bundles of the fine glass fibers and thus produce the intimate blending. Wet and dry turbulent blendings are encompassed. An important aspect of the process is the addition of the drag agent, such as colloidal silica, during the intimate blending in the turbulent blending zone.

---

This invention relates to novel fiber blends and to the processing of normally uncardable fibers to produce high strength yarns for weaving into cloth.

It is known that asbestos is a material that is well adapted to high temperature applications due to its incombustibility. At the same time, it is plentiful, and an economical material. It is a good heat barrier and has been widely used in pressed form as plates and the like for heat shields.

However, asbestos fibers suffer the disadvantage that they cannot be woven into cloth of an appreciable degree of strength because the yarns lack a high degree of coherency. This is particularly true with the shorter asbestos fibers.

According to the prior art, asbestos fibers have been blended with organic fibers to facilitate processing, improve strength, and reduce the bulk factor of yarns produced from them. Organic fibers such as cotton have been used for this purpose. The presence of the organic fibers, however, reduces the incombustible factor because the organic fibers burn readily.

When asbestos fibers, per se, are carded into yarns, the bulk factor goes way up and the strength factor drops rapidly.

Thus, though the organic fibers are undesirable, they have heretofore been a necessary compromise.

Prior to the present invention there has not been available a completely inorganic asbestos yarn with a high degree of strength and low bulk. Practical asbestos has generally comprised about 80% asbestos with 20% organic.

Even with the organic, the desired product has not been achieved. Thus, articles such as gloves and the like, made from organic blends, drop in strength rapidly as the organic fibers burn out from exposure to heat. Thus, the best products have a relatively short life under even reasonable conditions of use.

It is evident from the foregoing that the broadest applications of asbestos fibers have not been developed. One hundred percent incombustibility with high strength would provide the ideal product.

Therefore, a substantial advance to the art would be provided by an asbestos fiber strand, and cloth woven therefrom, of improved strength and high incombustibility factor.

Accordingly, it is an important object to provide asbestos strands of greater utility.

A further object is to provide woven asbestos cloth of higher strength and greater utility.

A further object is to provide woven asbestos cloth of greater strength, lighter weight, lower bulk, and with a higher incombustibility factor.

A further object is to provide improved processability in asbestos fibers.

A further object is to provide fiber blends that can be processed through conventional picking and carding equipment, which blends contain inorganic fibers of such short length as to be normally unprocessable, and very fine, non-brashy glass fibers of selected length.

A further object is to provide a process for producing handleable yarns of commercially useful strength from staple fibers of the nature of short, natural asbestos fibers.

A further object is to provide cardable blends of improved processability, containing asbestos fibers and very fine and non-brashy glass fibers, for producing asbestos cloth articles of higher strength and having a higher incombustibility factor.

THE INVENTION: PERSPECTIVE VIEW

Briefly, the present invention encompasses blends of short length asbestos fibers with staple glass fibers of a particular kind. In accordance with this invention, the glass fibers are of very fine diameter, not exceeding about .00015 inch. Commercially produced continuous fibers of this type have an average diameter of about .00014 inch and in said average include fibers of a diameter in the range from about .00018 down to about .00008 inch.

These very fine diameter fibers are extremely flexible and do not break when bent sharply, as in carding and weaving operations. Thus, they can withstand extremely small radii of bending without breaking.

These fibers are also characterized by the fact that they readily conform to surfaces of irregular contour and shape, which make contact with them, as in carding and weaving operations. Therefore, breakage is substantially non-existent. Further, these fibers also conform readily to the surfaces of other fibers with which they are blended.

Thus, the small fibers as contemplated herein, readily blend with other fibers without breaking, thereby displaying processability and blendability that distinguishes them from brashy and coarser fibers.

However, these fine glass fibers have very slippery surfaces and consequently are difficult to handle.

In accordance with the present invention, a drag or friction agent has been incorporated in the fiber blend to control the fine glass fibers, and overcome their inherent slipperiness.

The method aspect

As will become apparent later, there is a method aspect inherent in the present invention. This comprises the addition of a drag agent or friction agent to overcome the inherent slipperiness of the fine glass fibers, and to cause the two types of fibers to properly admix. One drag agent useable in accordance with the present invention is colloidal silica. Others of both inorganic and organic origin can also be used, however, as will be described later herein.

The drag agent functions to draw the two types of fibers together into an intimate blend, from which a handleable yarn of improved strength can be produced.

THE BLENDS

In accordance with the present invention blends within the following ranges are encompassed:

| Fiber: | Amount by weight, percent |
|---|---|
| Asbestos fibers | 10–90 |
| Fine glass fibers | 90–10 |

For greater temperature resistance it may be desirable to maintain the amount of asbestos at a higher level. However, since the blends are inorganic, a high incombustibility factor is always maintained. Also since the fine glass fibers have high strength, good coherency is always maintained for the yarns produced from the blends of this invention.

*Definition of the fine glass fibers.*—In the present invention, the length of the glass fibers is maintained at a minimum level for processability. Continuous, fine glass fibers have been utilized in making the present discovery. These are new in the art and it has only been very recently that fibers of such small diameter in continuous length have been made. The invention is not to be limited to the use of fibers of continuous origin however. Thus, fine glass fibers of appropriate length, if they can ever be made by flame attenuation or the like, are also to be encompassed within the scope of the invention.

The present invention therefore was effected by chopping continuous fine glass fibers into staple lengths of about 1 to 4 inches and separating the fibers. These fibers, when blended in the manner described, impart unexpectedly high coherency to asbestos yarns.

The novel handleable yarns of invention and cloth produced therefrom are characterized by the following properties:

A. Improved tensile strength;
B. Improved dimensional stability; and
C. Improved feel imparted to the woven cloth by the presence of the fine glass fibers. The feel provided is in the nature of that of cloth woven from expensive fur-like fibers; this is smooth and pleasant to the human touch.

THE METHOD

The method of the present inventon is manifested in several forms. However, in its broadest definition, the method comprises blending the selected length fine glass fibers and the short asbestos fibers together in the presence of an agent that will produce drag on the smooth surfaces of the fine glass fibers and thereby cause them to be combined into intimate association with the asbestos fibers.

In some instances, it may be desirable to add a small amount of organic fibers, as in the prior art, to enhance processing to a degree. In accordance with the present invention, however, this produces a transitory product. Thus, the first time a cloth woven from the blend is subjected to sufficient heat, the organic fibers will be burned out. This will produce a 100% incombustible product. But, in contrast to the prior art, the product will retain its strength. The glass preserves the strength.

At the present state of the art, the trade requests an asbestos yarn having a maximum incombustibility factor of about 94%. Thus, the trade will tolerate 6% combustibility and consider this a premium product by today's standards. However, in time, the trade should become educated to the completely incombustible products that can be made by the present invention, by entirely omitting the organic phase, and thus completely avoiding the burn out.

The specific ramifications of the process can be highlighted as follows:

Dry blending

In this operation, the fibers are placed in a mixing apparatus, such as a drum tumbler, picker, or other, and blended together. The fibers are coated with a drag agent to overcome the inherent slipperiness of the fine glass fibers and produce a mixing adhesion between all of the fibers. This can be done either at fiber forming, or during the blending.

The drag agent is suitably aqueous colloidal silica, and the water vehicle is subsequently removed by some drying means.

Addition of the drag agent can be effected by directing a spray or mist of the liquid material over the fibers in the blending vessel while they are being admixed together.

The blending and tumbling action of the mixing vessel causes the fine glass fibers to become at least partially separated from one another in the chopped strand form, i.e., it causes the bundles of fibers to open and become fiberized to provide thorough blending with the asbestos fibers.

It should be noted that the action of the chopper in breaking the strands into lengths produces some opening of the fibers, by the shock of the cutting action. Then, the blending operation further enhances this opening action.

If desired, the opening of the lengths of fine glass fiber strands can be further enhanced in a pre-blending operation. One suitable method is to pass the chopped strand lengths through a high velocity, turbulent air stream, such as produced by a spinning vortex blower.

Wet blending

In another aspect of the invention, the chopped strand lengths can be blended with shorter mineral fibers in an aqueous medium, as distinguished from the gaseous medium of the dry blending process.

This can be effected by first forming an aqueous slurry from the asbestos fibers. Thereafter, the chopped strand lengths, either with or without having been previously opened, are added to the slurry and the mixing continued until a uniform blend is produced.

It is to be understood that the extended scope of invention would include the preparation of a slurry of fine glass fibers first, and then with the addition of the asbestos thereto. Still further, it is possible that both dry fibers could be fed at the same time into an aqueous medium, for blending.

When the blending is performed by first preparing an aqueous slurry of asbestos fibers; and then adding the chopped fine glass fiber strand lengths, there may be a degree of extraction of the asbestos fibers. The extracted material may function to a degree as a drag or friction agent in facilitating the blending between the two types of fibers, and thereby overcome at least partially the inherent slipperiness of the fine glass fibers.

The aqueous blend produced by any of the foregoing is then withdrawn from the headbox of the blending machine and converted into a loose mat. The loose mat is then dried and carded for spinning into yarns.

In this aspect of the invention, the amount of drag agent added to the slurry can be reduced at least somewhat as compared to the amounts used in the dry blending operation. It is believed that this is made possible by the fact that the water functions to a degree to coat the glass fibers and produce partial adherency, perhaps by capillary attraction between them and the asbestos fibers. It is also possible to introduce the glass fibers with their surfaces in nascent form to enhance the blending, because of the greater drag or frictional characteristics of the nascent surfaces.

EXTENDED SCOPE OF INVENTION

The drag or friction agent has been mentioned above as colloidal silica. Also within the scope of invention, other materials can be used including aqueous silicates such as sodium silicate (water-glass), and the like. Syton is one particularly effective material. This is a trademark for a milky-white, stable 15% colloidal dispersion of silica in water. Additionally, organic materials such as aqueous phenolic resins and the like can be employed. Additionally, the fine glass fibers can be crimped or curled for enhanced drag.

In addition to the foregoing, it is contemplated that a fiber dispersant can be incorporated into the fiber blending operation, being suitably added along with the drag agent if desired. This helps to control static electricity and may function as a solvent for the size added during strand forming. This helps to separate the fibers from one another to a further degree than provided by the chopping, blowing and blending operations described.

In the present invention, blending can be defined as the introduction of the fibers into a turbulent mixing zone.

In addition to asbestos fibers, the scope of the invention is to be understood as including other inorganic fibers of a length too short to card, thus being analogous to asbestos fibers. The extended scope of invention therefore would include short length alumino-silicate fibers, short length aluminum oxide fibers, shorter length fine glass fibers of the flame attenuated type, and the like. Also, short length silica fibers per se and silica fibers made by leaching glass fibers to remove non-silica constituents could be processed in accordance with the present invention.

The minimum length of the fine glass fibers for proper blending is about one-half inch. The previous description has suggested lengths in the range of up to about 1" to 4". However, the extended scope of the invention is not to be limited other than in regard to the minimum length, that is required.

In the present invention the fine glass fibers can be defined as glass fibers having a diameter not exceeding about .00015 inch.

Also, within the scope of the present invention, glass is to be considered a thermoplastic material.

Within the scope of the invention, the fine fibers can be made from any suitable glass. As a general rule, they are presently being made from high modulus glass compositions that are relatively low in alkali content. However, within the scope of the invention a soda glass could well provide unexpected results. This type of glass would tend to be leached by ambient moisture and produce sodium silicate as a coating on the fibers. When blends containing this are subjected to elevated temperatures, the sodium silicate will fuse at lower temperatures to provide a bonding agent for the asbestos fibers with one another and between the glass and the asbestos fibers.

USES OF THE PRODUCTS OF INVENTION

Products made in accordance with the present invention can be used as reinforcement agents for ablative materials. In this type of product, the fiber blend is incorporated with a matrix resin and articles are shaped from the resin-fiber mass. Rocket nose cones are suitably made from resin-fiber blends of this type. During the high heat build up, as when a rocket reenters the earth's atmosphere, the glass and resin will burn out, leaving the asbestos as a residual material. This results in the dissipation of tremendous quantities of heat by the burning or fusion of the glass and the resin away from the asbestos skeleton.

Because of the fine diameter of the glass fibers, they wet out well with resins and thus induce resin wetability to the asbestos. Also, fine glass fibers have an extremely high capillary action because of the small diameter, and this enhances the resin wet out.

We claim:

1. A cardable blend including staple inorganic fibers of a length too short to be carded,
   glass fibers of at least about ½ inch length and having diameters in the range from about .00008 inch to about .00018 inch,
   and said fibers being intimately blended together in association with one another.

2. A cardable blend of fibers, comprising
   staple asbestos fibers of a length too short to be carded,
   glass fibers of at least about ½ inch in length, and having diameters in the range from about .00008 inch to about .00018 inch,
   said fibers being intimately blended together in association with one another,
   and a friction agent, comprising colloidal silica on the surfaces of at least a major portion of the glass fibers,
   whereby the inherent slipperiness of the surfaces of the glass fibers is reduced and the glass fibers are held in intimate admixture with the asbestos fibers.

3. A cardable blend including staple inorganic fibers of a length too short to be carded,
   and bundles of chopped continuous fine glass fibers held together by a forming size, but wherein the fibers of the bundles are at least partially separated, at least at the ends of the bundles,
   and the bundles of fine glass fibers having a length of at least ½ inch, with the fibers of the bundles having an average diameter not exceeding about .00010 to .00015 inch.

4. A cardable blend including staple inorganic fibers of a length too short to be carded,
   bundles of chopped continuous fine glass fibers of at least ½ inch in length, said fine glass fibers having an average diameter not exceeding about .00010 to .00015 inch, and wherein the fibers of the bundles are at least partially separated, at least at the ends of the bundles,
   and a friction agent on the surfaces of at least a major portion of the fine glass fibers to overcome the inherent slipperiness of the surfaces thereof and hold said fibers in intimate admixture with the inorganic fibers.

5. An intimate blend into association with one another of staple asbestos fibers of a length too short to be carded, and fine glass fibers at least about ½ inch long, and having a diameter in the range from about .00008 inch to about .00018 inch,
   said fibers being present in the following ranges:

|  | Percent by weight |
   |---|---|
   | Asbestos fibers | 50–90 |
   | Glass fibers | 50–10 |

6. An intimate blend into association with one another of staple inorganic fibers of a length too short to card per se, with glass fibers of at least about ½ inch length, and having a diameter in the range from about .00008 inch to about .00018 inch,
   and said fibers being present in the following ranges:

|  | Percent by weight |
   |---|---|
   | Inorganic fibers | 10–90 |
   | Glass fibers | 90–10 |

7. In a method of forming a cardable blend of inorganic fibers of a length too short to card per se into useful yarns,
   the steps of
   blending fine glass fibers of at least ½ inch length and of a diameter in the range from about .00008 inch to about .00018 inch with short, uncardable inorganic fibers in the presence of a friction agent that causes the inherently slippery surfaces of the glass fibers to adhere into intimate association with the inorganic fibers.

8. In a method of forming staple asbestos fibers into yarns,
   the steps of
   placing discrete asbestos fibers of a length too short to card per se and fine glass fibers of at least ½ inch length, of a diameter in the range from about .00008 inch to about .00018 inch, into a turbulent mixing zone, while in said zone, coating the fibers with an aqueous dispersion of colloidal silica to cause the inherently slippery surfaces of the glass fibers to associate into intimate relationship with the asbestos fibers, and then carding the blend into yarn.

9. In the method of forming a cardable blend of inorganic fibers of a length too short to card per se, the steps of providing continuous glass fiber strands, wherein the fibers of the strands are of an average diameter not exceeding about .00010 to about .00015 inch, chopping said strands into lengths of at least about ½ inch, subjecting said chopped strand lengths to a turbulent gas stream to at least partially separate the individual fibers of the lengths, at least at the ends of the chopped lengths, then combining said treated and partially opened lengths with staple asbestos fibers in a turbulent gas mixing zone, and while in said gas mixing zone, coating the fibers with a frictional agent to cause the inherently slippery glass fibers to adhere into intimate relationship with the asbestos fibers.

10. In a method of forming strands from staple asbestos fibers, the steps of preparing an aqueous slurry from the staple asbestos fibers of a length too short to card per se, adding to the slurry so produced a quantity of glass fibers having diameters in the range from about .00008 inch to about .00018 inch, and at least ½ inch long, adding a friction agent comprising colloidal silica to said aqueous asbestos fiber slurry, admixing to form a uniform aqeuous blend with the two types of fibers, forming the blended fibers into a loose mat, removing water, and carding the mat into yarn for spinning.

11. In the method of forming staple asbestos fibers into strands, the steps of placing discrete asbestos fibers of a length too short to card per se and fine glass fibers at least ½ inch long and having diameters in the range from about .00008 inch to about .00018 inch into a turbulent mixing zone in the range:

| | Percent by weight |
|---|---|
| Asbestos fibers | 10–90 |
| Glass fibers | 90–10 | while in said zone, coating the fibers with an aqueous dispersion of colloidal silica to cause the inherently slippery surfaces of the glass fibers to adhere into intimate relationship with the asbestos fibers, forming the blended fibers into a loose mat, removing water, and then carding the mat into yarn for weaving.

12. In a method of forming staple asbestos fibers into weavable yarns, the steps of preparing an aqueous slurry from discrete staple asbestos fibers of a length too short to card per se, adding to the slurry so produced a quantity of staple glass fibers in the range of about 10% to about 90% by weight of the total fiber mass, the staple glass fibers having an average diameter not exceeding about .00010 inch to about .00015 inch and being at least ½ inch long, adding a frictional agent comprising colloidal silica to said aqueous fiber slurry, admixing to form a uniform aqueous blend, forming the blended fibers into a loose mat, removing water, and then carding the mat into yarn for spinning.

13. A cardable fiber blend including staple, high temperature-resistant mineral fibers of a length too short to be carded per se, lower temperature heat-softenable fibers of at least about ½ inch length and having diameters in the range from about .00008 inch to about .00018 inch, and said fibers being intimately blended together in association with one another.

14. A cardable fiber blend including staple, high temperature-resistant mineral fibers of a length too short to card per se, and heat-softenable fibers, having diameters in the range from about .00008 inch to about .00018 inch, and being of an extremely high degree of flexibility that do not break when bent sharply and thereby readily conform to surfaces of irregular contour without breaking.

References Cited

UNITED STATES PATENTS

| | | | |
|---|---|---|---|
| 2,132,702 | 10/1938 | Simpson | 57—153 |
| 2,133,237 | 10/1938 | Slayter | 161—181 X |
| 2,145,235 | 1/1939 | Cryor | 57—140 |
| 2,306,781 | 12/1942 | Francis | 57—140 |
| 2,350,504 | 6/1944 | Geier et al. | 57—140 |
| 2,477,555 | 7/1949 | Roberts et al. | 161—170 |
| 2,554,963 | 5/1951 | Stafford | 161—168 X |
| 3,017,318 | 1/1962 | Labino et al. | 161—170 X |

FRANK J. COHEN, *Primary Examiner.*

JOHN PETRAKES, *Examiner.*